3,790,519
ASPHALTIC-PLASTOMERIC COMPOSITION
Harold J. Wahlborg, Baton Rouge, La., assignor to Copolymer Rubber & Chemical Corporation, Baton Rouge, La.
No Drawing. Filed Mar. 10, 1972, Ser. No. 233,744
Int. Cl. C08f 45/52, 15/04, 15/42
U.S. Cl. 260—28.5 AS        14 Claims

ABSTRACT OF THE DISCLOSURE

A blend of asphaltic material and plastomeric material, with or without polyethylene, in which the plastomeric material is in the form of an EPM or EPDM plastomer in which ethylene represents 75–90 mol percent of the ethylene-propylene content.

BACKGROUND OF THE INVENTION

This invention is addressed to blends of asphaltic and elastomeric materials with a view towards modifying the physical, mechanical and chemical properties of the asphaltic material whereby its toughness and flexibility are greatly improved with simultaneous decrease in the amount of tackiness, even at elevated temperatures, and wherein the asphaltic-elastomeric blend acquires more of the characteristics of the elastomer as distinguished from the characteristics of the asphalt.

PRIOR ART

Utilization of asphaltic materials is limited in many respects by their physical and mechanical properties. Asphaltic materials are soft and easily deformed, especially at elevated temperatures. Upon aging, asphaltic materials tend to bleed and become embrittled and crack.

Most asphalts remain tacky for a long period of time after application. While harder varieties of asphalt, such as 0–40 penetration, are not sticky, they are relatively inflexible and brittle and tend to crack.

Attempts have been made to increase the toughness and reduce the tackiness of asphaltic materials by the addition of low levels of uncured elastomeric materials, but the mixtures are still soft and sticky and remain characterized by poor tensile strength.

More recently, as described in the British Pat. No. 1,057,195, compositions have been produced in which the asphaltic materials have been mixed in a solvent system, with low levels (1–10% by weight) of ethylene-propylene copolymer rubbers (EPM) or interpolymers of one or more monoolefins containing 2–8 carbon atoms and an unsaturated endocyclic bridged-ring hydrocarbon, in which the ethylene-propylene ratio of the copolymer is within the range of 38–53 weight percent (48–63 mole percent) ethylene to 62–47 weight percent (52–37 mole percent) propylene. While improvements are achieved in adhesive strength, the materials do not form blends characterized by the desired improvement in toughness, flexibility and reduced tackiness.

In effect, mixtures of asphaltic materials with such conventional EPM elastomers having an ethylene content within the range of 35–74 mole percent ethylene, reflect the basic properties of the asphalt in that they remain soft, exhibit poor tensile strength and are very sticky at ambient temperature.

STATEMENT OF THE INVENTION

It is known that certain ethylene interpolymers, and particularly EPM and EPDM elastomers in which the ethylene content is within the range of 75–90 mole percent ethylene, have the inherent property of behaving as cured elastomers without having to undergo any known rubber cross linking or vulcanizing operation. These materials behave as thermoplastic elastomers in that, at room temperature they are tough and elastic and exhibit tensile strengths as high as 400 p.s.i., but upon warming they lose strength, become soft and plastic and melt. Upon recooling to room temperature, the material again exhibits its original tough elastic properties. Such materials which exhibit properties of both plastics and elastomers are hereinafter referred to as plastomers.

It has been found that EPM and EPDM plastomers, in which the ethylene-propylene ratio is within the range of 75–90 mole percent ethylene to 25–10 mole percent propylene are capable of being dissolved directly into hot asphaltic materials in amounts within the range of 0.2 to 50 percent by weight and preferably within the range of 5 to 25 percent by weight to produce plastomer-asphalt blends. With 5 percent or more of the plastomer, the blend tends to reflect the properties of the plastomer, as distinguished from the asphalt, in that at ambient temperatures the blends are tough and relatively tack-free and exhibit a high degree of elasticity. The blends can be applied as a hot melt or extruded into strips, sheets, or other articles. They can also be diluted with solvents such as xylene, kerosene and the like to facilitate ease of application.

It has been found that the range of 0.2 to 3 percent by weight of the high ethylene EPM or EPDM plastomer can be used effectively to upgrade poor or low grade asphalt into a good high quality asphalt having increased penetration resistance. For use as a roofing coating, it is desirable to make use of an asphalt blend which has been modified to contain from 4 to 15 percent by weight of the EPM or EPDM plastomer; for the coating of pipes, the EPM or EPDM is blended with the asphalt material in an amount within the range of 2 to 30 percent by weight; for the surfacing of roads by means other than the use of hot mixt aggregate, such as by spreading the asphaltic material directly onto the road surface, the EPM or EPDM is blended with the asphaltic material in an amount within the range of 4 to 25 percent by weight; for the coating of ponds and ditches, the EPM or EPDM is blended with the asphalt material in an amount within the range of 4 to 35 percent by weight.

The invention further contemplates the addition of a polyethylene in amounts within the range of 0.2 to 50 percent by weight of the asphalt-plastomeric blend, depending somewhat upon the use to be made of the blended asphaltic material, with 2 to 40 percent being preferred for pipe coating and 5 to 35 percent for most other uses. The polyethylene addition appears to retain its crystalline phase in the blend whereby tensile loss and deformation, under load at elevated temperature, is maintained. In the absence of the addition of polyethylene, the EPM or EPDM plastomer blend with asphalt tends to soften at elevated temperatures of 50° C. or more whereas the addition of polyethylene tends to increase the melting point of the blend to a point approaching that of the polyethylene.

Fillers of the type conventionally used with asphaltic materials for roofing, pipe wrap, road surfacing and the like, can be mixed into asphalt-plastomer blends of this invention in amounts within the range of 1 to 2000 parts by weight of filler to 100 parts by weight of the blend.

As used herein, the term "asphaltic or bituminous material" is meant to include such materials as:
(I) Asphalts
    (A) Petroleum asphalts, also called oil asphalts
        (1) Straight-reduced asphalts by:
            (a) Atmospheric distillation or vacuum (or partial-vacuum distillation)
            (b) Solvent precipitation, as with propane
        (2) Thermal asphalts, as residues from cracking operations in petroleum stocks (3) Air-blown asphalts
  (a) Straight-blown without catalysts
  (b) Blown in presence of catalysts
(B) Native or natural asphalts
  (1) With mineral content below 5 percent
    (a) Asphaltites such as gilsonite, grahamite, and glance pitch
    (b) Bermudez and other natural deposits
  (2) With mineral content over 5 percent
    (a) Rock asphalts
    (b) Trinidad and other natural deposits Included also within the term "asphalt material" are hydrocarbon waxes.

Straight-reduced and thermal asphalts are preferred to air-blown and native asphalts. Asphalts low in asphaltenes are preferred to asphalts high in asphaltenes.

The plastomers are ethylene-propylene copolymers (EPM) in which the ratio of ethylene to propylene is within the range of 75–90 mole percent ethylene to 25–10 mole percent propylene; or interpolymers of ethylene, a monoolefin containing from 3–16 carbon atoms and a polyene (EPDM) in which the mole percent of ethylene to propylene or other olefin of 3–16 carbon atoms is within the range of 75–90 mole percent ethylene to 25–10 mole percent of the monoolefin. The molecular weight of the plastomers, as indicated by RSV, is within the range of 0.5 to 4.0, but preferably within the range of 1.0 to 3.0.

The EPDM plastomers used in preparing the blends of this invention are the products resulting from the interpolymerization of a monomeric mixture containing ethylene, at least one other olefin such as a straight chain alpha-monoolefin containing from 3–16 carbon atoms, preferably propylene, or cyclic olefin such as bicyclo(2,2,1)heptene, and a polyunsaturated bridged-ring hydrocarbon having at least one carbon-to-carbon double bond in a bridged-ring, in solution in an organic polymerization solvent and in the presence of a Ziegler catalyst. In general, the basic reaction condition can be the same as that employed in the prior art for preparing EPDM rubbers.

Examples of the bridged-ring hydrocarbons include the polyunsaturated derivatives of bicyclo(2,2,1)heptane wherein at least one double bond is present in one of the bridged rings, such as dicyclopentadiene, bicyclo(2,2,1)hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 2–20 carbon atoms and preferably 2–10 carbon atoms. Other bridged-ring hydrocarbons include polyunsaturated derivatives of bicyclo(2,2,2)octane as represented by bicyclo(2,2,2)octa-2,5-diene, polyunsaturated derivatives of bicyclo(3,2,1)octane, polyunsaturated derivatives of bicyclo(3,3,1)nonane, and polyunsaturated derivatives of bicyclo(3,2,1)octane, polyunone double bond is present in a bridged-ring of the above compounds, and at least one other double bond is present in a bridged-ring or in a side chain. Further examples of polyunsaturated bridged-ring hydrocarbons and their use in the preparation of prior art EPDM rubber are found in U.S. Pats. Nos. 2,933,480, 3,093,620, 3,093,621 and 3,211,709, the disclosures of which are incorporated herein by reference.

The polyene or the polyunsaturated bridged-ring hydrocarbon will introduce a type of unsaturation in the interpolymer which is capable of vulcanization or cure as by conventional means. For this purpose the amount of polyene can be varied to introduce unsaturation in an amount corresponding to 1.5 up to 100 carbon-to-carbon double bonds per 1000 carbon atoms.

The vulcanization or cure characteristics of the interpolymer will be retained in the asphaltic interpolymer blend whereby additional toughness, strength and resiliency can be achieved by cure or vulcanization with respect to one or more of the double bonds of the blended interpolymer.

The polymerization solvent may be any suitable inert or saturated hydrocarbon which is liquid and relatively non-viscous under the reaction conditions, including the prior art solvents for the solution polymerization of monoolefins in the presence of a Ziegler catalyst. Examples of satisfactory hydrocarbon solvents include open chain saturated hydrocarbons containing 5–8 carbon atoms, of which hexane is usually preferred, aromatic hydrocarbons and especially those containing a single benzene nucleus such as benzene or toluene, and saturated cyclic hydrocarbons which have boiling ranges approximating those for the open chain and aromatic hydrocarbons discussed above, and especially saturated cyclic hydrocarbons containing 5 or 6 carbon atoms in the ring. The solvent may be a mixture of one or more of the foregoing hydrocarbons, such as a mixture of aliphatic and naphthenic hydrocarbon isomers having approximately the same boiling range as normal hexane. It is necessary that the solvent be dry and free of substances which will interfere with the Ziegler catalyst.

Ziegler catalyst in accordance with the prior art may be used in preparing the EPDM elastomer. In general, any suitable prior art Ziegler-type catalyst may be used which is known to produce a satisfactory elastomer. Ziegler catalysts are disclosed in a large number of issued patents, such as U.S. Pats. Nos. 2,933,480, 3,093,620, 3,093,621, 3,211,709 and 3,113,115. Examples of Ziegler catalysts include metal organic coordination catalysts prepared by contacting a compound of a metal of Group IVa, Va, VIa or VIIa of the Mendeleeff periodic chart of the elements, as typified by titanium, vanadium and chromium halides, with an organometallic compound of a metal of Group I, II or III of the Mendeleeff periodic chart which contains at least one carbon-metal bond, as typified by triethyl aluminum and alkyl aluminum halides wherein the alkyl groups contain 1–20 and preferably 1–4 carbon atoms.

The preferred Ziegler catalyst for many polymerizations is prepared from a vanadium compound and an alkyl aluminum halide. Examples of suitable vanadium compounds include vanadium trichloride, vanadium tetrachloride, vanadium oxychloride, vanadium acetylacetonate, etc. Activators which are especially preferred include alkyl aluminum chlorides of the general formulae $R_1AlCl_2$ and $R_2AlCl$ and the corresponding sesquichlorides of the general formula $R_3Al_2Cl_3$, wherein R is a methyl, ethyl, propyl, butyl or isobutyl radical. A catalyst prepared from methyl or ethyl aluminum sesquichloride and vanadium oxychloride is especially preferred, and when using this catalyst, the optimum ratio of the catalyst components is usually 1 mol of vanadium oxychloride for each 4–80 mols of the alkyl aluminum sesquichloride.

The properties of these blends are adequate for most applications without curing; however, the blend may be cured following prior art procedures, and special curing techniques are not necessary. As a general rule, curing procedure which is normally followed in curing the highly unsaturated hydrocarbon rubber component is also satisfactory in curing the blend. Various curing procedures, including the materials and the quantities thereof to be employed, are described in a large number of publications which are well known in the art. These publications include those previously mentioned. Additional publications include Principals of High Polymer Theory and Practice, Schmidt et al., Mc-Graw-Hill Book Company, New York (1948); Chemistry and Technology of Rubber, Davis et al., Reinhold Publishing Corporation, New York (1937); The Applied Science of Rubber, edited by W. J. S. Naunton, published by Edward Arnold, Ltd. London (1961), and the Encyclopedia of Chemical Technology, Kirk and Othmer, published by Innerscience Encyclopedia, Inc., New York (1953).

Fillers which may be used to lessen the cost of the compound and/or to modify the properties of the asphaltic-plastomeric blend include clays, whiting, organic resins, gilsonite, extender oils, atomite, gravel, sand, synthetic road fillers, carbon black, creosote oil and coal tars. Hard clays can be used to impart stiffness and abrasion resistance to the asphalt-plastomer blend. Additions of gilsonite provide stiffness and hardness to the blends. Aggregates such as sand lend stiffness and resistance to penetration and are used effectively, especially when the blend is exposed to elevated temperatures, such as 60° C. The amount of filler added can be varied from 1 to 2000 percent by weight of the blend, depending somewhat upon the blend and the use to be made thereof.

The asphaltic-plastomeric blend may be further modified by the addition of resinous or other polymeric materials, such as ethylene-vinyl acetate copolymer (EVA), isoprene polymers, styrene polymers and copolymers and natural resins, and tackifiers for achieving better adhesion, such as to concrete in road surfacing, in which such tackifiers may be represented by ethylene-butene copolymers, ethylene-hexene copolymers, polyisobutylene, terpenes and the like. Such modifying resinous polymers and/or tackifiers can be incorporated into the asphaltic-plastomeric blend in an amount within the range of 5 to 50 percent by weight of the blend.

When polyethylene additions are made to improve the properties of the blend at high temperature, such as at temperatures of 45–85° C., the amount of polyethylene can be varied within the range of 4 to 50 percent by weight on the blend. For this purpose, use can be made of readily available commercial polyethylenes, such as Epolene C–17, marketed by Eastman-Kodak Company (18,000 M.W.).

An important concept of this invention resides in the use of a plastomer, wherein the molecular ratio of ethylene to propylene in the EPM or ethylene to propylene or other monoolefin containing from 3–16 carbon atoms in the EPDM interpolymer, is within the range of 75–90 mol percent of ethylene to 25–10 mol percent of propylene or other monolefin. Under such circumstances, the plastomer can be blended, as by direct solution into the asphaltic material, preferably at elevated temperatures such as within the range of 100–250° C. This is to be distinguished from the process previously employed wherein it was necessary first to take up the plastomer into a solvent system for dispersion in the asphaltic material.

The blend of compatible asphaltic material and plastomer, embodying the features of this invention, acquires the characteristics of an elastomer in that it can be stretched with some degree of elastic memory and it is characterized by the toughness and strength of rubbery materials. The aging characteristics of the blend are also greatly improved over that of the asphalt.

The invention will now be described with reference to the following examples:

Example 1

The following example represents the manufacture of an EPDM rubber having bound ethylene to propylene in the ratio of 83:17 with an actual unsaturation level of about 5 carbon-to-carbon double bonds per 1000 carbon atoms.

The reaction vessel was a one-gallon Sutherland reactor equipped with a high speed, heavy-duty, air-driven motor; cooling coils; a thermometer; a temperature regulator; a pressure regulator; an injection port; and other openings where monomers, catalyst, and solvent were fed to the reactor. A tube dipping to the bottom of the reactor was present for the removal of the cement produced on a continuous basis. A vapor phase vent was provided to bleed off 15% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 70° C. After this, propylene was flushed through the reactor for about 15 minutes; then the temperature was lowered to ambient and two liters of Esso chemical grade hexane, dried over 4A molecular sieves and stored over sodium, was added to the reactor. As the temperature was brought to 41° C., propylene was fed to the reactor through a 4A molecular sieve column until 19.7 inches Hg pressure was reached. The pressure was then brought up to 30 p.s.i. with ethylene fed through a 4A molecular sieve column and approximately 0.12 ml. pyridine inhibitor and 2.66 cc. of 1.5 M ethyl aluminum sesquichloride were added.

The monomers were shut off and the catalysts, 0.165 molar ethylaluminum sesquichloride and 0.005 molar vanadium oxytrichloride at a 40 to 1 aluminum to vanadium ratio, were fed into the reactor at a constant rate until a drop in pressure in the reactor was noted. Also added 0.35 M butyl perchlorocrotonate at 7 to 1 ratio on vanadium. At this time the gaseous monomers were fed into the reactor through suitable calibrated rotometers at a rate of 2864 cc./minute, of which 2224 cc. were ethylene and 640 cc. were propylene; the termonomer 5-ethylidene-2-norbornene was added as a 0.33 M solution in hexane at 3.28 cc./minute which provided about 4.3 weight percent to be incorporated into the polymer. The polymerization was controlled by the catalyst pumps which added catalyst on demand as the pressure increased, thus maintaining the 30 p.s.i. pressure throughout the run. When the solution became approximately 7% polymer, solvent containing 16 cc./cc. ethylene was fed at the rate of 51.2 cc./minute into the reactor and the polymer cement taken off which produced about 180 g. of polymer per hour.

At this time the ethylene and propylene feeds were adjusted to 1601 cc./minute and 1534 cc./minute to compenate for the unreacted monomers removed with the cement.

The solution cement as removed from the reactor was fed into a Waring Blendor containing water where it was intimately mixed. The cement was then washed three times with equal volumes of water. The washed and stabilized cement (1 phr. on the rubber of the experimental stabilizer Irganox 1010—Geigy) was fed with nitrogen pressure into a T joint at the bottom of a 4-liter container full of hot circulating water. The other end of the T is connected to a steam line and steam was admitted at such a rate as to superheat the rubber cement. The solvent and unreacted monomers were mostly removed by this procedure. The rubber crumb was collected on a screen, washed and chopped up in a Waring Blendor. The rubber crumb was dried in the oven at 90° C. to remove any remaining solvent and water giving a rubbery copolymer which contained 84 mol percent ethylene analysis, and had a reduced specific viscosity in Decalin at 135° C. of 2.75. The unsaturation expressed in C=C/1000 carbon atoms was 4.8.

The polymer was analyzed for unsaturation based on a modification of the bromine method described in Organic Analysis, vol. 3, "Determination of Olefinic Unsaturation," p. 234.

Example 2

Preparation of EPM: An EPM of about 83 mol percent ethylene, prepared by the procedure described in Example 1 except that the 5-ethylidene-2-norbornene and pyridine were omitted.

Example 3

The following example represents the preparation of an EPDM rubber having a ratio of bound ethylene to propylene of 90:10 with an unsaturation level of 2 carbon-to-carbon double bonds per 1000 carbon atoms.

The reaction vessel was a one-gallon Sutherland reactor equipped with a high speed, heavy-duty, air driven motor; cooling coils; a thermometer; a temperature regulator; a pressure regulator; an injection port; and other openings where monomers, catalyst, and solvent were fed to the reactor. A tube dipping to the bottom of the reactor was present for the removal of the cement produced on a continuous basis. A vapor phase vent was provided to bleed off 15% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 70° C. After this, propylene was flushed through the reactor for about 15 minutes; then the temperature was lowered to ambient and two liters of Esso chemical grade hexane, dried over 4A molecular sieves and stored over sodium, was added to the reactor. As the temperature was brought to 60° C., propylene was fed to the reactor through a 4A molecular sieve column until 19.2 inches Hg pressure was reached. The pressure was then brought up to 30 p.s.i. with ethylene fed through a 4A molecular sieve column and approximately 0.12 ml. pyridine inhibitor and 2.66 cc. of 1.5 M ethylaluminum sesquichloride were added.

The monomers were shut off and the catalysts, 0.30 M ethylaluminum sesquichloride and 0.009 M vanadium oxytrichloride at 40 to 1 aluminum to vanadium ratio, were fed into the reactor at a constant rate until a drop in pressure in the reactor was noted. Also added 0.063 M butyl perchlorocrotonate at 7 to 1 vanadium. At this time the gaseous monomers were fed into the reactor through suitably calibrated rotometers at a rate of 2139 cc./minute, of which 1780 cc. were ethylene and 359 cc. were propylene; the termonomer ethylidene norbornene was added as a 0.09 M solution in hexane at 3.27 cc./minute which provided about 1.71 weight percent to be incorporated into the polymer. The polymerization was controlled by the catalyst pumps which added catalyst on demand as the pressure increased, thus maintaining the 30 p.s.i. pressure throughout the run. When the solution became approximately 5% polymer, solvent containing 16 cc./cc. ethylene was fed at the rate of 51.0 cc./minute into the reactor and the polymer cement taken off which produced about 123 g. of polymer per hour.

At this time the ethylene and propylene feeds were adjusted to 1113 cc./minute and 792 cc./minute to compensate for the unreacted monomers removed with the cement.

The solution cement as removed from the reactor was fed into a Waring Blendor containing water where it was intimately mixed. The cement was then washed three times with equal volumes of water. The washed and stabilized cement (1 phr. on the rubber of the experimental stabilizer Irganox 1010) was fed with nitrogen pressure into a T joint at the bottom of a 4-liter container full of hot circulating water. The other end of the T is connected to a steam line and steam was admitted at such a rate as to superheat the rubber cement. The solvent and unreacted monomers were mostly removed by this procedure. The rubber crumb was collected on a screen, washed and chopped up in a Waring Blendor. The rubber crumb was dried in the oven at 90° C. to remove any remaining solvent and water giving a rubbery copolymer which contained 90.4 mol percent ethylene by infrared analysis, and had a reduced specific viscosity in Decalin at 135° C. of 2.26. The unsaturation expressed in C=C/1000 carbon atoms was 1.7.

The polymer was analyzed for unsaturation in the manner previously described.

Example 4

1.5 g. of EPM of Example 2 (83% ethylene and 17% propylene, ML 1+8=35) and 8.5 g. of 60–70 penetration asphalt was placed in a small beaker and heated in a sand bath to 220° C. with mixing for 4 hours. The hot solution was then poured onto a Teflon sheet and allowed to cool. The cooled sheet was tough, elastic and essentially tack-free.

Example 5

Mixtures were made of the EPDM rubber of Example 1, Humble VVR asphalt and a Humble 85–100 penetration asphalt, with and without the addition of a low molecular weight, low density commercial polyethylene (Epolene C-17 of Eastman-Kodak Company) in the amounts set forth in the following tabulation. The various mixtures were heated in a beaker to 200° C. with stirring for 4 hours and poured hot onto a Teflon sheet. To prepare tensile bars, the mixtures were molded between two Teflon sheets at 120° C. in a heated press and the tensile bars were cut from the resulting slabs. The bars were tested for tensile strength and elongation with the results set forth in the following tabulation:

| Number | Weight percent | | | | Tensile, p.s.i. | Elong. percent |
| | EPDM | Epolene C-17 | VVR | 85/100 Pen. | | |
| --- | --- | --- | --- | --- | --- | --- |
| 1 | 8.6 | 13.2 | 16 | 62 | 121 | 885 |
| 2 | 13.3 | 8.6 | 16 | 62 | 161 | 910 |
| 3 | 22 | 0 | 16 | 62 | 464 | 890 |
| 4 | 34.5 | 22.5 | 0 | 43 | 2,000 | 845 |

Example 6

The effect of polyethylene on softening was demonstrated visually as follows: Two test blends were prepared, the first of which consisted of 22 weight percent EPDM of Example 1, 16% by weight Humble VVR asphalt of more than 325 penetration, and 62% by weight Humble 85–100 penetration asphalt. The second blend consisted of 13.5% EPDM rubber of Example 1, 8.6% low molecular weight, low density commercial polyethylene (M.W. 18,000) (Epolene C-17 of Eastman-Kodak Company), 17% VVR Humble asphalt and 62% 85–100 penetration asphalt. The mixtures were blended in a beaker heated to 200° C. for 4 hours and then poured onto a Teflon sheet.

Flat sheets of equal thickness were pressed from each blend and strips of equal dimension were cut from the sheets. The strips were hung in an oven at 40° C. and the temperature of the oven was slowly raised. At about 60° C., the first blend without polyethylene began to sag. At 68° C., a considerable amount of the first blend had dripped to the bottom of the oven. At this temperature, the second strip still had its original size and shape. It was not until the temperature exceeded 83° C. that the second strip began to sag and melt.

It will be apparent from the foregoing that I have provided a new and improved asphaltic material which is characterized by the toughness, strength and resiliency of elastomeric material and which embodies many of the characteristics of an elastomer. The asphaltic-plastomeric blends of this invention expand the utilization which can be made of asphaltic materials and improve the characteristics of such asphaltic materials in applications that are currently being made thereof.

It will be understood that changes may be made in the details of formulation and operation without departing from the spirit of the invention, especially as defined in the following claims.

I claim:

1. An asphaltic-plastomeric blend in which the plastomeric material is present in the blend in an amount within the range of 0.2 to 50 percent by weight and in which the plastomeric material is selected from the group consisting of (1) a copolymer of ethylene and a monoolefin having from 3–16 carbon atoms and (2) an interpolymer of ethylene, a monoolefin having from 3–16 carbon atoms and a polyene in the form of an unsaturated bridged-ring hydrocarbon in which the mole ratio of ethylene to monoolefin in the copolymer and interpolymer is 75–90 mol percent ethylene to 25–10 mol percent monoolefin.

2. An asphaltic-plastomeric blend as claimed in claim 1 in which the monoolefin is propylene.

3. An asphaltic-plastomeric blend as claimed in claim 1 in which the unsaturated bridged-ring hydrocarbon is 5-ethylidene-2-norbornene.

4. An asphaltic-plastomeric blend as claimed in claim 1 in which the monoolefin is propylene and the unsaturated bridged-ring hydrocarbon is 5-ethylidene-2-norbornene.

5. An asphaltic-plastomeric blend as claimed in claim 1 in which the plastomer is present in the blend in an amount within the range of 4 to 25 percent by weight.

6. An asphaltic-plastomeric blend as claimed in claim 1 in which, for purposes of upgrading the asphaltic material, the plastomeric component is present in an amount within the range of 0.2 to 3 percent by weight.

7. An asphaltic-plastomeric blend as claimed in claim 1 in which, for purposes of using the blend as a roofing material, the plastomeric material is present in an amount within the range of 4 to 15 percent by weight.

8. An asphaltic-plastomeric blend as claimed in claim 1 in which, for purposes of using the blend as a pipe coating, the plastomeric material is present in the blend in an amount within the range of 2 to 30 percent by weight.

9. An asphaltic-plastomeric blend as claimed in claim 1 in which, for purposes of using the blend in road surfacing, the plastomeric material is present in the blend in an amount within the range of 4 to 25 percent by weight.

10. An asphaltic-plastomeric blend as claimed in claim 1 in which, for purposes of using the blend for the coating of ponds and ditches, the plastomeric material is present in the blend in an amount within the range of 4 to 35 percent by weight.

11. An asphaltic-plastomeric blend as claimed in claim 1 which includes a polyethylene in an amount within the range of 0.2 to 50 percent by weight.

12. An asphaltic-plastomeric blend as claimed in claim 11 in which the polyethylene is present in an amount within the range of 4 to 25 percent by weight.

13. An asphaltic-plastomeric blend as claimed in claim 1 which includes an additive selected from the group consisting of a filler, a resinous polymeric material and a tackifier in which the filler, when present, is present in an amount within the range of 1 to 2000 percent by weight of the blend and in which the tackifier or resin, when present, is present in an amount within the range of 5 to 50 percent by weight.

14. An asphaltic-plastomeric blend as claimed in claim 11 which includes an additive selected from the group consisting of a filler, a resinous polymeric material and a tackifier in which the filler, when present, is present in an amount within the range of 1 to 2000 percent by weight of the blend and in which the tackifier or resin, when present, is present in an amount within the range of 5 to 50 percent by weight.

References Cited
UNITED STATES PATENTS

| | | | |
|---|---|---|---|
| 3,669,918 | 6/1972 | Roley, Jr. | 260—28.5 AS |
| 3,336,252 | 8/1967 | Raichle et al. | 260—28.5 AS |
| 3,329,636 | 7/1967 | Henschel | 260—28.5 AS |
| 3,173,903 | 3/1965 | Lukach et al. | 260—88.2 |
| 3,063,973 | 11/1962 | Cladding | 260—79.5 |

MORRIS LIEBMAN, Primary Examiner
S. L. FOX, Assistant Examiner

U.S. Cl. X.R.
260—28.5 A, 28.5 B, 88.2 R

UNITED STATES PATENT OFFICE
CERTIFICATE OF CORRECTION

Patent No. 3,790,519         Dated February 5, 1974

Inventor(s) Harold J. Wahlborg

It is certified that error appears in the above-identified patent and that said Letters Patent are hereby corrected as shown below:

column 3, line 58, cancel "(3,2,1)octane, polyun"

and substitute --- (3,2,2)nonane. At least ---

Signed and sealed this 5th day of November 1974.

(SEAL)
Attest:

McCOY M. GIBSON JR.
Attesting Officer

C. MARSHALL DANN
Commissioner of Patents